UNITED STATES PATENT OFFICE.

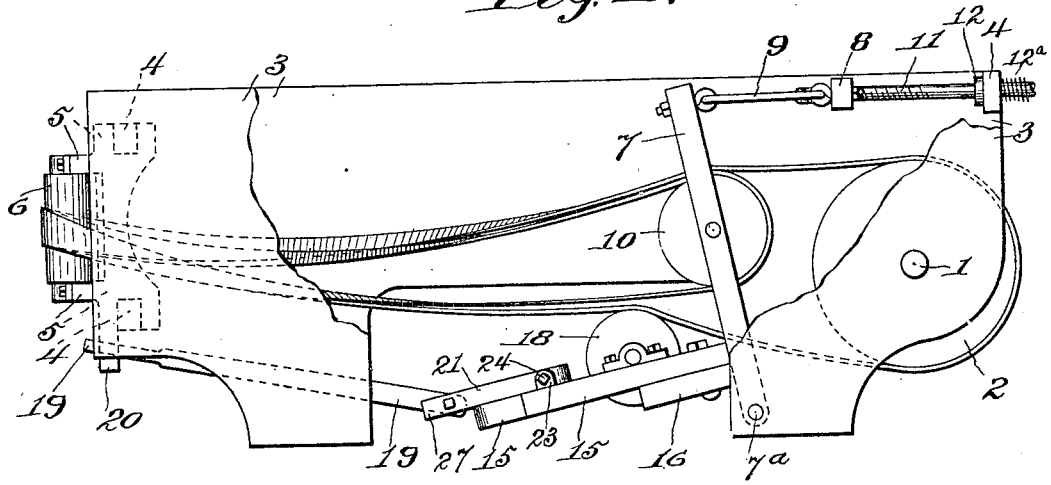

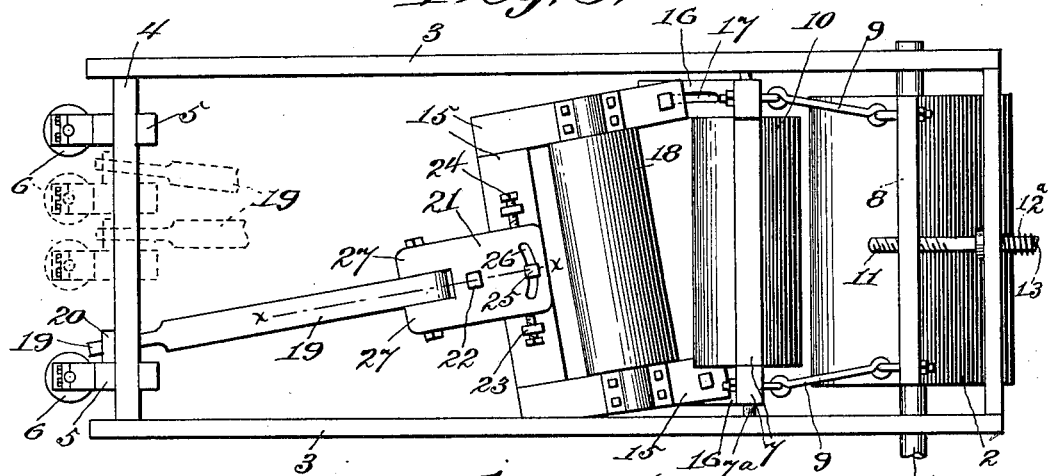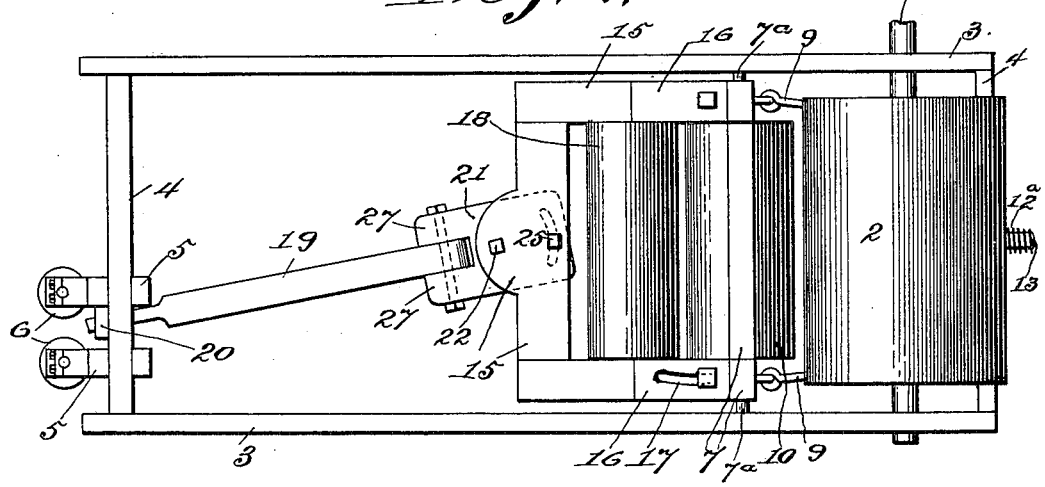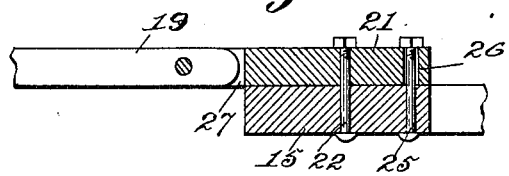

WILLIAM G. GAUM, OF PANTHER, WEST VIRGINIA.

BELT-TIGHTENER.

No. 825,645.  Specification of Letters Patent.  Patented July 10, 1906.

Application filed October 24, 1905. Serial No. 284,169.

*To all whom it may concern:*

Be it known that I, WILLIAM G. GAUM, a citizen of the United States, residing at Panther, in the county of McDowell and State of West Virginia, have invented certain new and useful Improvements in Belt-Tighteners, of which the following is a specification.

This invention relates to belt-tighteners, and has special reference to improvements on my patent for belt-tighteners issued April 4, 1905, No. 786,354.

The prime object of this invention is to provide means for tightening belts of any length, and particularly belts of great length, and to adapt said means to machines of various widths and lengths, whereby the belt may be followed in its various positions by an auxiliary tightening-pulley.

A further object of the invention is to provide in a belt-tightener an auxiliary hanger having a tightening-pulley and pivoted to a main hanger having a tightening-pulley, said auxiliary hanger being adjustable at right angles to the main hanger, according to the length of the belt, and adapted to be raised and lowered by the swinging of the main hanger.

A still further object of the invention is to provide in a belt-tightener an auxiliary tightening-pulley journaled in an auxiliary hanger adjustably pivoted to a main hanger having a tightening-pulley, said auxiliary hanger having a guide-arm pivotally connected therewith, the latter hanger adapted to be adjusted according to the course or line of the belt, whereby the auxiliary pulley is made to follow the various positions of the belt.

In the accompanying drawings, forming part of this application, Figure 1 is a side elevation with the frame partly broken away, showing the belt out of action. Fig. 2 is a similar view showing the belt in action. Fig. 3 is a top view with the belt removed, showing the auxiliary hanger swung to one side, the dotted lines indicating other positions of the hanger. Fig. 4 is a similar view looking at the under side with the auxiliary hanger straight and the guide-bar swung in the opposite direction to that shown in Fig. 3. Fig. 5 is an enlarged detail sectional view taken on the line $x\,x$, Fig. 3. Fig. 6 is a detail perspective view of guide and guide-bar. Fig. 7 is a detail section showing the screw and the parts through which it works.

The same numeral references denote the same parts throughout the several views of the drawings.

The driving-shaft 1 has a pulley 2, working between the sides 3 of a suitable frame 4, the latter having adjustable brackets 5, in which are journaled vertical pulleys 6. This frame may be attached to the floor in convenient position to a planing, sizing, molding, or other similar machine, or it may be secured to such machines.

The main or vertically-disposed hanger 7 has its lower ends pivoted at 7ª, and its upper ends are connected together and to a cross-head 8 by links 9. The tightening-pulley 10 is journaled in the hanger 7. A screw 11 is operated by a handle 11ª through the cross-head 8 to move the latter, and the screw has a collar 12 formed thereon, from which extends a stem 13 through the frame portion 4, and a spiral spring 12ª is carried by the stem to keep the screw always under spring tension.

The auxiliary tightener consists of a hanger 15, pivoted to projections 16 of the vertical hanger 7, and one of said projections has a slot 17, whereby the pivot movement of the hanger 15 may be varied, as desired or occasion may demand. An idler or belt-bearing pulley 18 is journaled in the hanger 15, and an arm or guide-bar 19 is coupled to the hanger 15 and works through a guide 20 on one of the brackets 5.

The coupling between the guide-bar 19 and the hanger 15 comprises a coupling-head 21, pivoted to the hanger 15 at 22 between hanger-lugs 23, having set-screws 24, a king-bolt 25, operated in a slot 26, and arms 27 between which the guide-bar is pivoted.

In operation to tighten a belt the main or vertical hanger is swung forward by operating the screw 11, and such forward movement raises the auxiliary hanger, with its idle pulley, against the belt, and the pulleys of both hangers may be made to further tighten the belt by turning the screw 11. It will be seen that the position of the auxiliary hanger may be changed relative to the vertical hanger so as to place the idle pulley at various distances from the vertical hanger, according to the length of a belt; that the auxiliary hanger may be placed at various angles, according to the position in which the vertical pulley is placed for wide and narrow work, and that in whatever position said pulley is placed the auxiliary hanger may be put in alinement therewith through the guide-bar by adjusting the coupling-head. It is obvious that a free pivot movement is made between the auxiliary hanger and the guide-bar to permit a vertical swing of said hanger and that the latter is free to be moved laterally on the projections of the vertical hanger, so as to have the idle pulley centrally under the belt.

Having thus described my invention, what I claim as new, and desire to secure by Letters Patent, is—

1. The combination, with the vertical pulleys, the horizontal pulleys, the vertical hanger, a tightening-pulley journaled therein, and means for operating the hanger, of an auxiliary hanger carried by the vertical hanger, an idle pulley journaled in the auxiliary hanger, and a guide-bar connecting the latter hanger with one of the said vertical pulleys.

2. In a belt-tightener, the combination with the vertical hanger, a tightening-pulley journaled therein, and means for operating the hanger, of an auxiliary hanger adjustably pivoted to the vertical hanger and having an idle pulley, a coupling-head pivoted to the auxiliary hanger, and a guide-bar pivoted in said head.

3. In a belt-tightener, the combination, with a vertically-disposed pulley-hanger, and means for swinging it back and forth, of an auxiliary pulley-hanger extending laterally from the vertical hanger and adapted to swing vertically.

4. In a belt-tightener, the combination, with a vertically-disposed pulley, an adjustable bracket in which the pulley is journaled, a guide on the bracket, and a horizontal pulley, of a vertical hanger having projections, a pulley carried by the hanger, an auxiliary hanger pivoted to and adjustable on said projections, an idle pulley journaled in this hanger, a coupling-head pivoted to the auxiliary hanger, a guide-bar pivoted in the coupling-head and working in the said guide, and means for operating the vertical hanger.

5. In a belt-tightener, the combination, with an auxiliary hanger having an idle pulley and hung to swing vertically and adapted to be adjusted lengthwise the belt, of a guide-bar having a free end carried by one of the vertical belt-pulleys, a coupling-head pivoted to the hanger and having the other end of the guide-bar pivoted therein, and means for adjusting said head to move the hanger crosswise the belt.

6. The combination, with an auxiliary hanger adapted to swing vertically and laterally, an idle belt tightening-pulley journaled in the hanger, and means for swinging the hanger, of a guide-bar to keep the hanger in alinement with the belt, and a coupling-head pivoted to the hanger and having said bar pivoted therein.

In witness whereof I hereunto set my hand in the presence of two witnesses.

WILLIAM G. GAUM.

Witnesses:
J. VAN R. GARDNER,
DOLLIE ARNN.